Nov. 23, 1937.                H. BENECKE                2,099,997
        COIL BODY FOR FIELD COILS OF ELECTRODYNAMIC LOUDSPEAKERS
                        Filed July 31, 1934
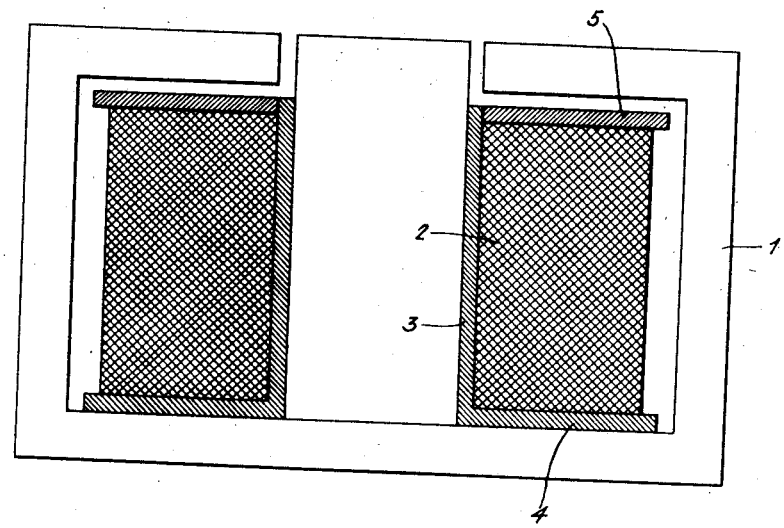
INVENTOR
HEINRICH BENECKE
BY HGGrover
ATTORNEY Patented Nov. 23, 1937

2,099,997

UNITED STATES PATENT OFFICE 2,099,997

COIL BODY FOR FIELD COILS OF ELECTRODYNAMIC LOUDSPEAKERS

Heinrich Benecke, Berlin, Germany, assignor to Telefunken Gesellschaft für Drahtlose Telegraphie m. b. H., Berlin, Germany, a corporation of Germany Application July 31, 1934, Serial No. 737,712
In Germany July 26, 1933

1 Claim. (Cl. 179—117)

The invention relates to an improvement of field coils of electrodynamic loudspeakers.

In dynamic loudspeakers having a separately excited field, difficulties are encountered in that it is not always possible to favorably remove the heat developed in the field coils. In particular, in loudspeakers utilizing large field energies it is often necessary to depart from the pot shape of the field so in order that the field can carry a greater load and to provide a U-shape for the field since in this case the cooling is essentially more favorable. The field coils for these loudspeakers are ordinarily manufactured in such manner that the wire is wound upon the coil body, thus facilitating the manufacture and serving at the same time for the insulation of the field coil against the magnetic field. Since the coil bodies are formed of an electrical insulating material, whereby these materials are at the same time also poor conductors of heat, the electrical load of such coils is limited since wound-in cooling ribs are only economical within certain limits.

In loudspeakers of small field energy resort was had to winding the field coil directly upon the core so as to obtain a favorable cooling in particular in the interior of the field coil. In the event of any damages of the field coil, in this case ordinarily the entire loudspeaker was to be replaced.

In accordance with the invention the coil body or support is made of material of a favorable thermic conduction, in particular of metal, whereby the tube of the coil surrounds the core of the magnetic field as closely as possible in order to avoid air cushions between coil body and the magnet system which would represent a favorable heat insulation. Furthermore, it is of advantage to bring the flanges of the coil body in close touch with the iron of the field and which can at least be accomplished at one of the flanges.

The metallic coil body is preferably completely or partially coated with lacquer. The lacquer to be employed is preferably one which is a good electrical insulator but also a good heat conductor, such as a lacquer with quartz filling.

The choice of the metal for the coil body depends upon the construction of the entire system. A coil body of iron provides a decrease of the average length of the winding of the wire and thus a reduction of the length of the iron path, since the core can be maintained thinner in accordance with the thickness of the winding body. Yet the iron flange produces a strong dispersion of the magnetic field in the vicinity of the air gap so that it will be more advantageous to replace the iron flange by one of non-magnetic material. In this manner a coil body of two different materials is obtained. As second material copper is to be considered, wherewith a strong dispersion of the magnetic field is avoided, and at the same time a favorable electrical damping of the eventually pulsating field is obtained by the copper flange and the self induction of the moving coil is diminished.

The figure shows an embodiment of the inventive idea by way of example, and indicates a coil body consisting of two different metals. Herein is 1 the magnetic field system with the winding 2 wound upon the coil body or support. The coil body consists of the coil tube 3, and a flange 4 of some metal for instance iron, while the flange 5 is formed of another metal such as copper. For many purposes of application it is sufficient to form only the coil tube or only the flanges of material of favorable thermic conduction. When the coil tube 3 and the flange 4 are formed of metal, the flange 5 near the air gap is formed of electrically insulating material, for example, of impregnated fibrous material or the like.

What I claim is:

A magnet system for an electrodynamic loudspeaker comprising a central pole piece, an air gap, a tubular member of metal adapted to fit snugly about said central pole piece, disposed on said central pole piece, said tubular member being coated with a lacquer having a quartz filling, flanges at opposite ends of said tubular member, the flange at the end of said tubular member adjacent said air gap being of non-magnetic, impregnated fibrous material having a high coefficient of heat transfer, the flange at the other end being of metal, and a field winding applied to said lacquer-coated tubular member between said flanges, said lacquer-coated tubular member providing good electrical insulation and also good heat conduction for the field winding.

HEINRICH BENECKE.